United States Patent [19]

Goffe

[11] 4,095,233

[45] June 13, 1978

[54] METHOD FOR FORMING A CHARGE PATTERN

[75] Inventor: William L. Goffe, Webster, N.Y.

[73] Assignee: Xerox Corporation, Stamford, Conn.

[21] Appl. No.: 701,323

[22] Filed: Jun. 30, 1976

[51] Int. Cl.[2] ...................... G01D 15/18; G03G 15/00

[52] U.S. Cl. .......................................... 346/75; 346/1; 355/3 CH

[58] Field of Search .................... 346/75, 1; 355/3 CH

[56] References Cited

U.S. PATENT DOCUMENTS

| | | | |
|---|---|---|---|
| 2,676,868 | 4/1954 | Jacob | 346/159 X |
| 3,298,030 | 1/1967 | Lewis et al. | 346/75 |
| 3,578,970 | 5/1971 | Michaud et al. | 355/3 CH UX |
| 3,715,762 | 2/1973 | Magill et al. | 346/159 |
| 3,757,164 | 9/1973 | Binkowski | 355/3 CH X |
| 3,982,251 | 9/1976 | Hochberg | 346/75 X |
| 4,034,379 | 7/1977 | Berry | 346/75 X |

*Primary Examiner*—George H. Miller, Jr.
*Attorney, Agent, or Firm*—James J. Ralabate; John E. Beck; George J. Cannon

[57] ABSTRACT

An ink jet apparatus deposits a pattern of charged, substantially colorless droplets on an insulating imaging surface. The droplets are dried to leave an electrostatic charge pattern. The charge pattern is developed using conventional techniques and can be electronically read.

15 Claims, 4 Drawing Figures

METHOD FOR FORMING A CHARGE PATTERN

BACKGROUND OF THE INVENTION

This invention relates generally to a method and apparatus for forming a charge pattern on an imaging surface and more particularly to a method for forming a charge pattern using an ink jet apparatus.

The formation of charge patterns an imaging surfaces is well known, especially in the xerographic arts. In xerographic processes, typified by the Carlson process originally disclosed in U.S. Pat. No. 2,297,691, a photoconductive insulating imaging surface is first uniformly electrostatically charged. The charged surface is then exposed to imagewise radiation to which the surface is sensitive, such as light, and the charge in the radiation-struck area is dissipated. The charge remains on the imaging surface in the non-radiation-struck areas to form a charge pattern. Such a charge pattern is commonly referred to as an electrostatic latent image.

The uniform charging of the imaging surface is typically accomplished, for example, by the method disclosed in U.S. Pat. No. 2,588,699 to Carlson which involves the use of an ion producing filament or filament arrays operating on corona discharge principles. However, such uniform charging can be accomplished by contacting the surface with a charging electrode as disclosed in U.S. Pat. No. 2,774,921 or with a charging brush as disclosed in U.S. Pat. No. 3,146,385. Other methods of uniform charging include the use of pin electrode arrays as disclosed in U.S. Pat. Nos. 2,934,650; 3,649,830; 3,655,966 and 3,689,767.

An alternative method of forming a charge pattern by uniformly charging an imaging surface with a charging electrode through a mask is described by Gundlach in U.S. Pat. No. 2,912,586.

The charge pattern thus formed is oftentimes made visible or developed with marking material by development processes well known in the xerographic arts. A typical such development process is described by Carlson in U.S. Pat. No. 2,297,691.

A method for forming a charge pattern on an imaging surface alternative to the method of charging through a mask is desirable. Such an alternative method which can produce charge patterns responsive to electrical input from, for example, a computer or a remote optical scanning device, is especially desirable.

Ink jets are well known in the art as a means for direct writing on an imaging surface. Ink jets normally project a dyed or pigmented liquid onto an imaging surface responsive to electrical or mechanical control. Various types of ink jets are known. Some produce a stream of liquid which is broken into droplets by ultrasonic vibration as the stream emerges from a nozzle. Other ink jets rely on an electric field to draw droplets from the open end of a small nozzle. Still others use pulsing mechanisms to squirt droplets from an orifice.

In many of the known ink jets direct writing systems the droplets are charged as they exit the ink jet orifice. The droplets are most often charged so that their trajectory from the ink jet orifice to the imaging surface can be controlled by electrons placed along the trajectory. The electrodes are usually electrically controlled, for example, by computer output or by remote optical scanning of an original image.

Typical examples of direct writing with charged, colored particles from ink jets are shown in U.S. Pat. Nos. 3,596,275 to Sweet and 3,852,772 to Hecht et al.

Sweet discloses deflection of charged droplets to create an image pattern on a surface. Sweet shows the use of electrodes to deflect the droplets. Hecht et al shows uncharged droplets impinging on a receiver sheet while selectively charged droplets are deflected.

It is to be noted that the use of deflecting electrodes requires that the ink jet orifice be spaced a distance from the imaging surface sufficient to permit the electrode to have an effect on the trajectory of the ink droplet. Such spacing is sometimes undesirable in compact arrangements of apparatus.

The direct writing ink jets of the prior art generally make use of dyed or pigmented liquids. Such liquids are known to dry in the ink jet orifice when not in frequent use, causing clogging problems. One attempt to overcome the clogging problem common to most direct writing ink jets centers around increasing the orifice size. However, increasing the orifice size undesirably reduces the resolution of the directly written image. The larger orifice size results in the image being written with large droplets which are capable of less image definition.

A method and apparatus for forming a charge pattern on an insulating surface using a stream of ionized fluid, such as gas, is disclosed in U.S. Pat. No. 3,715,762 to Magill et al. However, the method so disclosed requires a second non-ionized, fluid stream to deflect the ionized stream when no charge is desired on the insulating surface. Ionized gases are known to be unstable and difficult to control with accuracy, and there is no way in such a system to visibly inspect the charge pattern prior to development, if desired.

SUMMARY OF THE INVENTION

It is, therefore, an object of the present invention to create charge pattern on an imaging surface.

It is a further object of the invention to create a charge pattern on an imaging surface responsive to electrical input.

It is also an object of the invention to generate a charge pattern on an imaging surface utilizing an ink jet apparatus.

It is yet another object of the invention to construct a charge pattern of useful resolution on an imaging surface.

It is an object of the present invention to electronically read charge patterns on an imaging surface.

It is yet a further object of the invention to render visible charge patterns created from colorless ink droplets.

A further object of the invention is to write a latent image on a substrate with colorless ink droplets and to develop the latent image with electrostatic toner.

These and other objects are achieved, generally speaking, by a method for forming a charge pattern on an insulating imaging surface which comprises depositing a droplet layer of charged, substantially colorless droplets in a pattern configuration on the surface, the droplets being deposited by an ink jet means, and allowing the droplets to dry, leaving a charge pattern on the surface. Alternatively, the surface is uniformly precharged and selective portions of the surface are discharged by such droplets charged with a polarity opposite that of the surface. After the droplets are dried a charge pattern remains on the imaging surface.

In further steps, the charge pattern is made visible by development and is read by electronic recognition equipment.

DESCRIPTION OF THE PREFERRED EMBODIMENT

Figure 1:
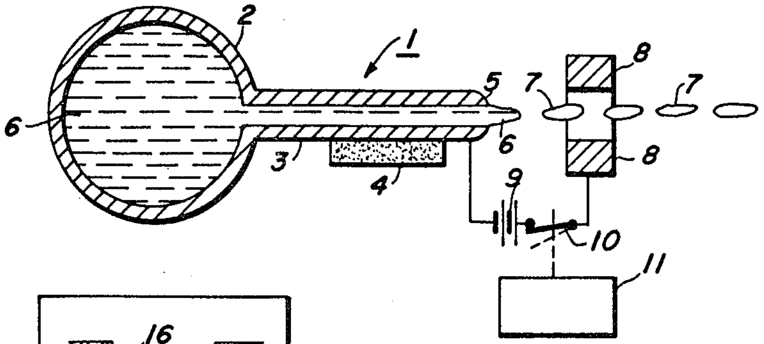
FIG. 1 shows schematically and in enlarged cross-section a typical ink jet apparatus including a charging mechanism.

Referring more specifically to FIG. 1 there is shown an ink jet apparatus, generally designated 1, which comprises reservoir section 2 and nozzle section 3. Ultrasonic vibrator 4 is attached to nozzle 3 so that when activated vibrator 4 causes a vibration of orifice 5 at the end of nozzle section 3 opposite reservoir section 2.

Liquid 6 is maintained under pressure in reservoir section 2 so that a steady stream of liquid 6 flows from orifice 5. The vibrations translated to orifice 5 by vibrator 4 cause the stream of liquid 6 to break up into droplets 7.

Droplets 7 pass through annular ring 8 as they leave ink jet apparatus 1. Annular ring 8 and ink jet apparatus 1 are electrically connected through power source 9 so that droplets 7 acquire a charge as they pass through annular ring 8.

Control switch 10 is placed in the connecting circuit between power source 9 and ring 8 so that the potential to ring 8 may be interrupted. Droplets 7 do not obtain a charge when passing through ring 8 when switch 10 is open.

Switch 10 is connected to switch control mechanism 11 which may be a simple manually operated device or may be, for example, an electronic computer or a remote optical scanner.

It is to be understood that the ink jet apparatus of FIG. 1 is not to be considered limiting but is illustrative of any of the various kinds of ink jet apparatus which are useful in the present invention. Many of the useful sorts of such apparatus are mentioned above. Descriptions of other useful ink jet apparatus can be found in U.S. Pat. No. 3,747,120 to Stemme, in the publication "Ink Droplet Printing Devices" by Robert D. Carnahan, *TAPPI*, Vol. 58, No. 7, July 1975, pages 82–86 and in the publication "High Frequency Recording With Electrostatically Deflected Ink Jets" by R. A. Sweet, *The Review of Scientific Instruments*, Vol. 36, No. 2, Feb., 1965, pp. 131–136.

Liquid 6 may be any suitable substantially colorless liquid. Because the liquid is not used to mark the imaging surface as in direct writing techniques, it need not be pigmented or dyed. However, it is sometimes desirable to use a small amount of dye in the liquid so that the image created by the droplet layer can be observed to development. The liquid should be capable of being charged. Typical such liquids are water and liquids of a higher volatility such as the alcohols. Volatile solvents containing electrolites are especially well suited for use in this invention because of their quick drying properties and their ability to accept charge. The preferred electrical properties for ink jet printing inks described by Kamphoefner in "Ink Jet Printing" *IEEE Transactions On Electron Devices*, Vol. ED-19, No. 4, April 1972.

Because the colorless liquids such as water and alcohols leave little or no residue upon drying, the ink jet nozzle clogging problem mentioned above is substantially reduced and smaller ink jets giving higher resolution in the charge pattern can be used. An additional advantage of using smaller droplets is that charging rates can be increased on droplet streams of a fixed flow as described in detail by Schnieder et al in "Stability of an Electrified Liquid Jet", *Journal of Applied Physics*, Vol. 38, No. 6, p. 2599–2605, May 1967. Charge patterns of high electrical density are established by the present invention while avoiding the resolution-limiting disadvantages of highly pigmented inks, described above.

The amount of charge placed on each droplet by ring 8 or by any of the other useful charging means is any useful amount. The charge placed on the droplet should produce an electrostatic charge on the imaging surface sufficient for the required purposes. For example, if the charge pattern on the surface is to be developed by known xerographic means, the charge required on the surface will depend on the effective capacity of the surface and the development means. For example, with CZ1900 dielectric paper (dielectric constant about 3 and thickness about 5 micrometers) the voltage for magnetic brush development should be about twice as high as that for electrophoretic development (usually about 150v.). Electronic reading of the charge pattern will generally require a charge of less magnitude.

For example, a charge of $6 \times 10^{-13}$ coul./droplet is used for droplets 0.073mm in diameter at a charging potential of 150v and a droplet rate of $10^5$ droplets/sec. from a single orifice. Such an arrangement is equivalent to a current density of about $1.43 \times 10^{13}$ amps/cm$^2$ and results in a charge on a dielectric imaging surface producing about 300v. Typically, on a droplet of 0.073mm diameter charges of from about $6 \times 10^{-15}$ to about $1 \times 10^{-12}$ coul/droplet are useful. A charge of about $6 \times 10^{-15}$ coul/droplet is readily detectable by most reading means and yet is sufficiently small to avoid electrostatic interaction between droplets. The charge on the droplet is varied sometimes to control the density of the image which is made visable in the subsequent development step.

Figure 2:
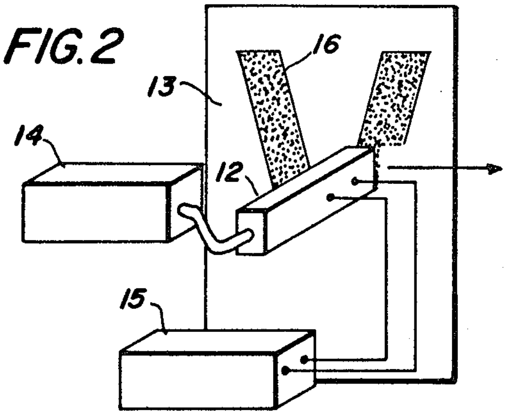
FIG. 2 shows schematically a perspective view of an ink jet apparatus performing the method of the present invention wherein only charged droplets are deposited.

Referring more specifically to FIG. 2 there is shown in perspective view an apparatus for performing the method of the present invention by depositing charged particles. on an imaging surface. Ink jet nozzle 12 is arranged to scan imaging surface 13 in the direction shown by the arrow. At the end of each scan it is indexed and returned to a starting position to begin a subsequent scan.

A colorless liquid is held in reservoir tank 14. As the nozzle 12 scans surface 13 nozzle 12 is selectively activated by electronic control unit 15 to deposit charged droplets on surface 13 to form charge pattern 16.

Any suitable imaging surface 13 may be used. The surface should be capable of holding charge pattern 16 at least until it has been used for its intended purpose. For example, surface 13 should hold charge 16 until it is developed or "read" by an electronic recognition apparatus Typically surface 13 is a dielectric material such as plastic film, rubber, or dielectric paper. Other useful materials for surface 13 are deformable thermoplastics for use in deformation imaging systems such as those described in U.S. Pat. Nos. 3,320,060; 3,338,710; 3,404,001 and 3,615,387. Still other useful materials for surface 13 are charge deformable fluids such as, for example, liquid crystals. Surface 13 can also be formed from a conductive material having a barrier layer overcoating. A dielectric paper such as CZ1900 available from Crown Zellerbach is frequently preferred because of its subsequent usefulness as a document after xerographic development of the charge pattern.

An alternative method (not shown) for practicing the present invention includes pre-charging the imaging surface with any suitable means, such as a corona discharge device, and placing in pattern configuration on the surface a droplet layer of substantially colorless droplets of the opposite polarity from the uniform charge on the imaging surface. The charge on the droplets at least partially neutralizes the charge on the surface so that a charge pattern remains on the surface in the non-neutralized areas.

Figure 3:
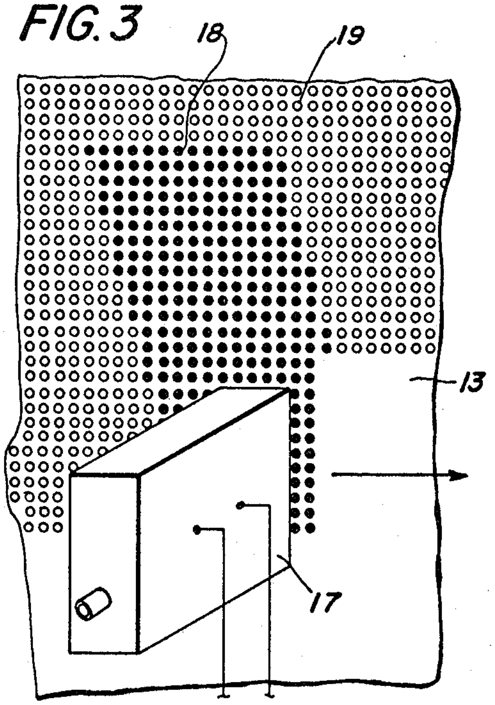
FIG. 3 shows schematically and greatly enlarged a perspective view of an array of ink jets performing the method of the present invention wherein both charged and uncharged droplets are deposited.

Referring more specifically to FIG. 3 there is shown in greatly enlarged perspective view a portion of an imaging surface 13 which is being scanned by multiple orifice ink jet recording head 17 in the direction shown by the arrow. Head 17 deposits liquid droplets in a droplet layer on surface 13. The droplets are charged in image area 18 and uncharged in non-image area 19. The individual droplets on the layer prevent charge spreading between droplets.

A charge pattern is formed on surface 13 in image area 18 by the charged droplets deposited there.

Figure 4:
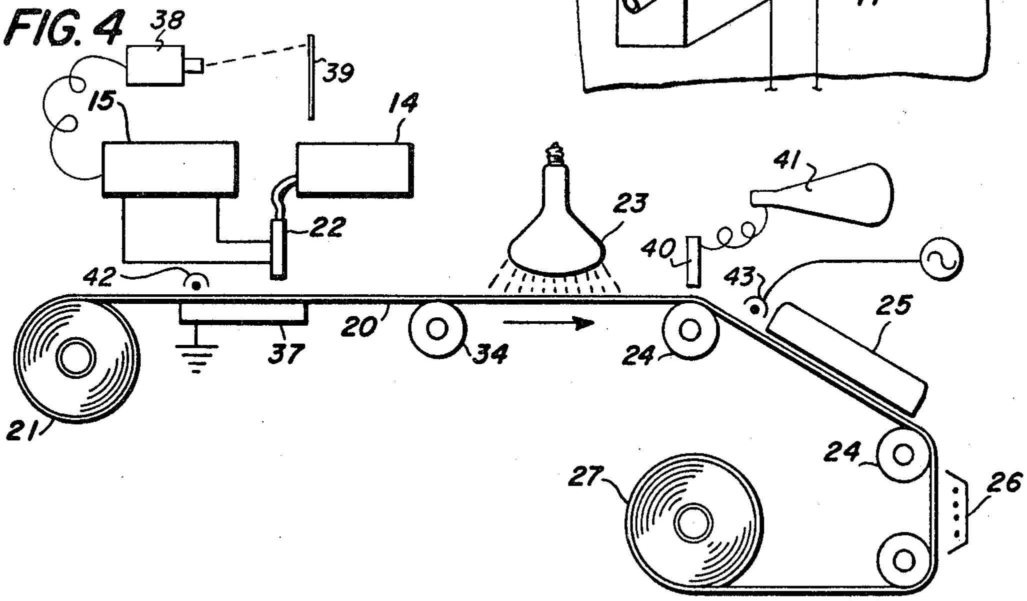
FIG. 4 shows schematically and in cross-section an apparatus for performing the present invention including the additional steps of drying the deposited droplets and developing the charge pattern.

Referring more specifically to FIG. 4 there is shown schematically and in cross section an automatic apparatus for producing developed images on an imaging surface corresponding to charge patterns placed on the surface by an ink jet apparatus in accordance with the method of the present invention.

Continuous imaging surface 20 is unrolled from supply roll 21 and moved in the direction shown by the arrow. Multiple ink jet recording head 22 comprises an array of adjacent ink jet nozzles. The array is substantially the same width as surface 20. A charge pattern is established on surface 20 as it passes head 22 by either the method shown in FIG. 2 or FIG. 3.

Grounded support means 37 enables an equal and opposite charge to be established on the opposite side of surface 20 from the charge pattern. Such a grounded support means 37 in effect reduces the capacitence of support 20 so that undesirably high voltages are not created by the charged droplets.

A colorless liquid from reservoir tank 14 is selectively charged and deposited on surface 20 by head 22 in accordance with input from electronic control unit 15. As discussed above, unit 15 can provide head 22 with input from a variety of sources such as, for example, optical scanning devices and computers.

In FIG. 4, input unit 15 is from optical scanner 38 which scans original 39 at a speed synchronous with the movement of surface 20 as it passes head 32.

The liquid droplets on surface 20 are dried by heat source 23 as surface 20 moves over support rollers 24 leaving an electrostatic charge pattern on surface 20. Any suitable heat source may be used. The heat source should be capable of drying the droplets relatively quickly without disturbing their location. Typically, such suitable sources of heat include heat lamps, electric coils, low-pressure air knifes, heated rollers and the like. Radiant or thermally conductive heat sources are preferred over forced air drying apparatus because of the reduced opportunity they provide for disturbing the droplets during drying.

The charge pattern on surface 20 is observed by electronic reader 40 and is displayed on cathode ray tube 41 for visual inspection prior to development at developing station 25.

After drying of the droplets, the charge pattern remaining on surface 20 is developed at developing station 25. Methods of developing charge patterns are well known in the art, and any suitable such method may be used. Typically such development methods include cascade development, powder cloud development, magnetic brush development, polar liquid development, donor development, fluidized bed development and the like. Disclosures of such well known development methods are found, for example, in U.S. Pat. Nos. 2,681,551 and 2,825,814 to Walkup; 2,618,552 to Wise; 2,846,333 to Wilson; 3,084,043 to Gundlach and 3,015,305 to Hall.

The developed charge pattern on surface 20 is then fixed to surface 20 by any suitable means such as radiant heat-fixing means 26. Suitable fixing methods and apparatus are disclosed in greater detail in U.S. Pat. Nos. 3,130,064; 3,667,280; 3,655,280; 3,215,116 and 3,591,276.

After development and fixing of the image, surface 20 is collected on rewind roller 27.

It is to be understood that other uses can be made of the charge pattern on surface 20 other than development and fixing as shown in FIG. 4. For example, the charge pattern can be read by an electronic recognition device.

However, if it is desirable to, for example, electronically read the charge pattern on surface 20 and then to reuse the surface, it can be uniformly discharged by such means as an AC corotron. Alternatively, if surface 20 is photoconductive, it can be discharged by exposure to light while grounded.

The invention enables a variety of alternative methods of operation. In one alternative method, surface 20 is uniformly charged to one polarity by a charging means such as corona device 42. Droplets carrying a charge of the opposite polarity are placed in imagewise configuration on surface 20 by head 22. The charge on surface 20 is neutralized by the oppositely charged droplets, leaving an imagewise charge pattern which is the reverse of the droplet pattern. This charge pattern can be developed at developing station 25 or observed by an electronic reader or both.

In one alternative embodiment, the charge pattern (either a positive or reverse pattern) is observed by reader 40 and then erased by erasing corotron 43. In such an alternative embodiment, surface 20 can be reused.

Methods of making charge patterns on imaging surfaces according to the present invention will now be described by way of example by which other useful variations and procedures will become clear to those skilled in the art.

EXAMPLE I

An ink jet apparatus similar to that shown in FIG. 1 is arranged to deposit droplets on an imaging surface as shown in FIG. 2. The ink jet is scanned across the surface and indexed after each scan. While scanning, it is selectively activated to deposit charged droplets on the imaging surface in a desired pattern.

Water is used as the colorless liquid and a charge of 3 $\times 10^{-13}$ coul./droplet is supplied to each droplet. The droplets are deposited on a dielectric plastic imaging surface.

After the scanning by the ink jet is completed, the surface is scanned with an electrometer to determine the location and strength of the charge on the surface. A charge pattern is observed which is substantially equivalent in all dimensions to the pattern of charged droplets placed on the imaging surface. The pattern has a strength of about 100v.

EXAMPLE II

An ink jet apparatus similar to that shown in FIG. 4 is constructed so that it has a length sufficient to reach the width of the imaging surface. One thousand individual ink jets are arranged along the apparatus. The imaging surface is chosen to be an 8½ inches wide roll of CZ1900 dielectric paper.

Isopropyl alcohol is selected as the colorless liquid with which the ink jet apparatus is loaded. The individual ink jets in the apparatus are addressed by a computer which has been programmed to produce droplets in a charge pattern on the imaging surface as it moves relative to the apparatus. The computer output is synchronized with the speed of the surface.

The computer addressing system is activated and the imaging surface is moved past the apparatus at a speed of about 10 inches/sec. The apparatus covers the entire surface with droplets, with selected ones of the droplets being charged to produce a pattern of words in a Century Schoolbook 10pt. italic font.

After the droplets are deposited, they are dried by radiant heat and the remaining charge pattern is developed by a toned magnetic brush passing over the surface. The developed image is fused to the paper surface using radiant heat from an electric resistance coil. An image of high resolution is observed.

It will be appreciated that other variations and modifications will occur to those skilled in the art upon reading of the present disclosure. For example, several charge patterns may be sequentially established and developed on a single surface with each development being in a different color to result in a multicolor composite image. Such variations are intended to be within the scope of this invention.

What is claimed is:

1. A method for forming a charge pattern on an insulating surface, comprising:

(a) producing substantially colorless charged droplets and uncharged droplets by means of an ink jet apparatus;

(b) depositing both said charged and uncharged droplets on said insulating surface wherein said charged droplets are in a patterned configuration; and (c) allowing the droplets to dry so that a charge pattern remains on said insulating surface in said patterned configuration.

2. The method of claim 1 wherein said surface is uniformly pre-charged in one polarity and the droplets are charged in the opposite polarity.

3. The method of claim 1 wherein the charge pattern is read by an electronic recognition means.

4. The method of claim 1 wherein the charge pattern is made visible by xerographic development.

5. The method of claim 1 including the additional setp of removing said charge pattern from said surface.

6. The method of claim 1 wherein the droplets contain sufficient dye to be visually inspected.

7. The method of claim 1 wherein the drying is aided by heating the surface.

8. The method of claim 1 wherein the ink jet means is selectively activated responsive to optical scanning of an original image.

9. The method of claim 1 wherein the ink jet means is selectively activated responsive to computer output.

10. An apparatus for creating a charge pattern on an insulating imaging surface which comprises:

(a) an ink jet means for producing both charged droplets and uncharged droplets;

(b) a grounded support means for said insulating imaging surface; and (c) a control means for driving the ink jet means such that both said charged and uncharged droplets are deposited on said insulating imaging surface with said charged droplets being deposited in a patterned configuration.

11. The apparatus of claim 10 including a means for reading the charge pattern.

12. The apparatus of claim 10 including a means for xerographically developing the charge pattern.

13. The apparatus of claim 10 including a means to aid drying of the droplets.

14. The apparatus of claim 10 including a means for uniformly pre-charging said insulating surface with a charge having a polarity opposite that of the charged droplets.

15. The apparatus of claim 10 including a means for erasing the charge pattern from said insulating surface.

* * * * *